March 6, 1934.  C. E. MAYNARD  1,949,752

TIRE BUILDING DRUM

Filed Dec. 4, 1931

INVENTOR.

BY Charles Edgar Maynard

Chapin & Neal
ATTORNEY.

Patented Mar. 6, 1934

1,949,752

UNITED STATES PATENT OFFICE 1,949,752

TIRE BUILDING DRUM

Charles Edgar Maynard, Northampton, Mass., assignor to Roland W. Boyden and Charles A. Dana, receivers for The Fisk Rubber Company, Chicopee Falls, Mass., a corporation of Massachusetts Application December 4, 1931, Serial No. 579,067

3 Claims. (Cl. 154—10)

This invention relates to apparatus for building pneumatic tire casings and more particularly to means for use with semi-flat tire building drums to permit the construction of a wider range of tire sizes and shapes on a drum of given dimensions, as well as a more exact control of the product.

In the building of tire casings on semi-flat drums it is desirable that the crown diameter of the building drum should bear a certain relation to the bead diameter of the drum in order that the proper amount of stretch shall be imparted to the carcass fabric in the building operation, that is, in the assembling of the tire elements on the drum, and in the subsequent shaping of the tire carcass to tire form after it is removed from the drum. According to usual practice the cord fabric used in constructing the tire carcass is cut on the bias, that is, the cords in the cut strip of fabric lie at an angle to the length of the strip. This cord angle of the cut strips differs from the cord angle in the finished tire due to the movement of the cords in stretching and shaping the strip onto the semi-flat drum to partial tire form and the further movement of the cords in the subsequent shaping operation which brings the carcass to complete tire form. In general the relation between the crown diameter of the drum and its bead diameter gives a control of the degree of change from the cord angle as cut to that in the finished tire. The nature and advantages of this control are more fully set forth in the copending applications of George L. Mather, Serial Numbers 251,343 and 346,004.

This change in cord angle is not a simple change and while it is customary to speak of a tire as having a given finished cord angle, meaning the cord angle at the center of the crown of the finished tire, it is obvious that the cords have different angularities at different points between the beads and crown of the finished tire. In addition to the change in angularity from that of the cut strip to that of the finished tire, the cords undergo other changes of position in the building and shaping operations, such as an increase in the spacing of the cords, the maximum increase in spacing being normally found at the crown of the tire. A slight elongation of the cords also takes place. The change of position of the cords, considered as a whole, in bringing the carcass material from its initial condition of single curvature to the double curvature of the finished tire is in itself extremely complicated and is further complicated by the variations in the tire specifications, such as the size, the number of plies, the thickness of the rubber coatings, the character of the beads, and the character of the sidewall and tread reenforcements, as well as by the size of the cords, their flexibility and elasticity and the characteristics of the rubber compounds used. All of these as well as other factors must be taken into consideration in designing the shape and proportions of the drum on which the tire is to be built. As above pointed out, part of the change in cord position may be made to take place when the carcass material is stretched and/or shaped onto the building drum, with the change being completed during the final shaping operation after the tire is removed from the drum. The proportions of the cord position change as divided between the "building" operation and the "shaping" operation is controlled for a given size of tire by the cross-sectional shape of the drum. As a result the exact shape of the drum upon which a given tire is to be built is governed by elaborate mathematical and empirical formulas based on the judgment and experience of the tire engineer in his division of the cord changes in various parts of the tire between the tire "building" and "shaping" operations.

From the above it will be apparent that if a given practice is to be followed changes in tire specifications must find their counterpart in changes in the shape of the drum, resulting in an excessive number of different drum contours. It is one object of my invention to provide means by which a single drum conforming to the general requirements of a wide series of tire specifications may be made to conform exactly to the requirements of any one of the series, thus substantially reducing the cost of drum equipment and at the same time making possible a more uniform and scientifically correct product. My device has the further advantage that drums having a relatively large crown diameter and relatively small bead diameter may be readily collapsed, for removal of the tire therefrom, using conventional collapsing chucks which of themselves have an inadequate degree of collapse for such drums as heretofore constructed. Other and further objects, advantages and applications of my invention will be apparent from the following specification and claims.

In the accompanying drawing which illustrates one embodiment of my invention,

Figure 1:
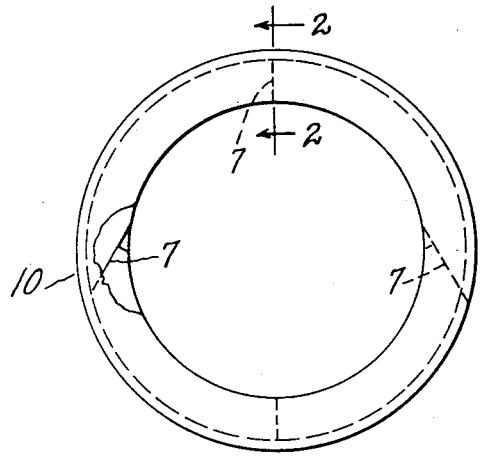
Fig. 1 is a side elevation of a semi-flat drum employing my invention.
Figure 2:
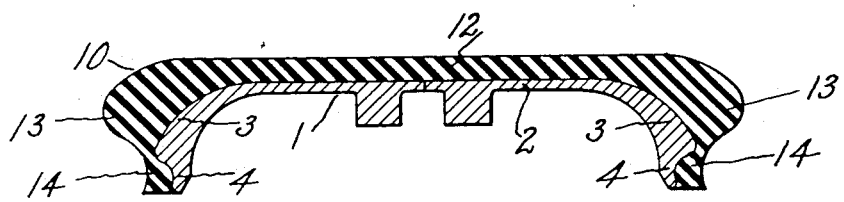
Fig. 2 is a section, on a larger scale, substantially on line 2—2 of Fig. 1.

Referring to the drawing, 1 designates a semi-flat building drum having a substantially flat crown portion 2, curved sidewall portions 3 and bead portions 4. It will be understood that the height of the crown portion 2 above the bead position is such as to give the degree of stretch to the crown portion of the carcass allotted to the "building" portion of the tire manufacturing operation and that portions 3 and 4 are curved, in accordance with the formula being followed, to alter the cord positions at those points in the desired manner for a tire of a given size and specification.

The drum is divided, as indicated at 7, into a plurality of sections and is mounted on any suitable collapsing chuck by which the sections may be collapsed inwardly to permit removal of the tire. Assuming now that it is desired to build a tire of larger cross-sectional size but of the same bead diameter, I apply to the drum 1 an annular member 10, formed of any suitable material, preferably rubber, and having a substantially flat crown portion 12, curved sidewall portions 13 and bead portions 14 all of which when the member 10 is combined with the drum 1, exactly conform in dimensions, curvature and position to the requirements of the larger tire as called for by the formula or practice it is desired to follow. The inner surface of the member 10 is the complement of the shape of the drum upon which it is mounted but, if made of rubber, is made slightly smaller so that the member is held snugly in place during the building operations. It should be noted that with a given practice the contour of the drum 1 and the outer contour of the member 10 will be sufficiently similar so that the thrust of the stitchers, bead setters and other tools employed in assembling the carcass elements will have no undue tendency to displace the member.

The member 10 remains in the tire when the drum 1 is collapsed and no greater degree of collapse is therefore necessary to enable the drum sections to clear the beads than for tires having the same crown diameter as the drum alone. This illustrates one important application of my invention since by its use tires of greater cross-section may be built semi-flat than has hitherto been possible because of the impracticability of constructing chucks having a degree of collapse sufficient to accommodate the crown height necessary for tires of large cross-section, and this feature may dictate the use of my invention apart from its other advantages.

Figure 3:
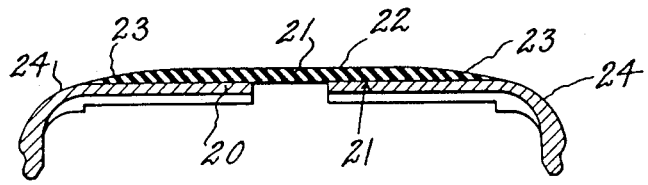
Fig. 3 is a sectional view showing a further application of my invention.

In Fig. 3 I have illustrated my invention embodied in member 21 applied to a drum 20 in which the needed modification of contour and dimensions is satisfied by a slightly increased height at the crown 22 and a prolongation 23 of the sidewall curves 24 of the drum, the inner surface of the member 21 being complementary to the surface of the drum 20. Obviously my invention may be utilized to make whatever changes may be necessary in drum profile to meet the requirements of the tire to be built thereon and it will be understood that the invention is in no way limited to the two forms illustrated; it being contemplated that members of various shapes singly or in superposed combination may be employed to secure the desired drum profile in the best manner.

Having thus described my invention, I claim:

1. A building drum comprising separable coaxial, superposed annular sections, the outer profile of the inner section being shaped for the construction of a tire of given specifications, the inner profile of the outer section being the complement of the outer profile of the inner section and the outer profile and dimensions of the outer section being such as to modify the tire building characteristics of the inner section in a predetermined manner, said inner section being transversely divided into a plurality of sections to permit the collapse of the inner annular section inwardly away from the outer annular section.

2. A device for use with a collapsible tire building drum which comprises an annular member adapted to be positioned on the building surface of the tire building drum, the dimensions and shape of said member being such as to adapt said drum for the building of a tire of increased cross-sectional size but of the same bead diameter.

3. An annular member, formed of flexible material, having its inner surface conformable to a given building drum contour and having its outer surface shaped for the building of a tire of the same bead diameter but of otherwise differing characteristics.

CHARLES EDGAR MAYNARD.